United States Patent
Hansen et al.

[11] Patent Number: 6,072,611
[45] Date of Patent: Jun. 6, 2000

[54] COMMUNICATION CHANNEL FOR SYNCHRONIZING EQUIPMENT IN SYNCHRONOUS COMMUNICATION SYSTEM

[75] Inventors: Hans P. Hansen, Howell; Kevin Jacobs, Middletown, both of N.J.

[73] Assignee: AT&T Corp, New York, N.Y.

[21] Appl. No.: 08/951,697

[22] Filed: Oct. 16, 1997

[51] Int. Cl.[7] .................. H04J 14/00; H04B 10/00
[52] U.S. Cl. ............... 359/119; 359/165; 370/471; 370/475; 370/907
[58] Field of Search ................ 359/110, 119, 359/165; 370/403, 907, 471, 475

[56] References Cited

U.S. PATENT DOCUMENTS 5,650,994  7/1997  Daley ........................... 370/401
5,724,510  3/1998  Arndt et al. .................... 370/475

*Primary Examiner*—Kinfe-Michael Negash

[57] ABSTRACT

Method and apparatus for providing a communication link between support equipment in an optical network and an operation support system. In a first embodiment, dark bandwidth of the communication trunks is appropriated for use as a service channel. A master service node receives messages from the operation support system and places the messages in the dark bandwidth. Local service nodes, provided in an optical ring, monitor the dark bandwidth and route message either to support equipment at the node or to other local service nodes as appropriate. Multiplexors are provided at the master service node and local service nodes to interface between optical network elements and support equipment. A second embodiment provides a radio link between the operational support system and the service nodes of the optical network.

17 Claims, 6 Drawing Sheets

COMMUNICATION CHANNEL FOR SYNCHRONIZING EQUIPMENT IN SYNCHRONOUS COMMUNICATION SYSTEM

BACKGROUND OF THE INVENTION

The present invention relates to telecommunications networks and, more particularly, to a method of providing operational support in a synchronous optical network.

Modern telecommunications networks are evolving. There is a shift from asynchronous communications networks to synchronous communications networks. The advent of optical transport as a transmission technique has given rise to a set of standards for a synchronous optical network ("SONET") in the United States and in Europe. The United States standards are found in ANSI T1.105, ANSI T1.106 and ANSI T1.107; the European standards are found in the SDH standard established by ITU-T. In these optical networks, SONET network elements ("SNE's") exchange data over interconnecting optical cable. Synchronization of each SNE is maintained by a timing signal generator ("TSG") and related peripheral equipment. The TSG establishes a timing reference, either through GPS equipment incorporated into the TSG or by derivation from the SNE's optical transport.

Both SNE's and TSG's must be monitored, maintained and configured by a network administrator, such as a Operation Support System ("OSS"). Although the SONET standard dedicates bandwidth to provide for OSS messaging to the SNE's, no such accommodations are made for TSG's or the other peripheral equipment.

Accordingly there is a need in the art for a means for providing communication between a TSG and an OSS in a SONET network.

SUMMARY OF THE INVENTION

The disadvantages of the art are alleviated to a great extent by a communications system that provides a communication link between an operation support system and support equipment at the SONET network element. In a first embodiment, the invention exploits dark bandwidth in the SONET communication protocol to build a communication channel with the support equipment. In a second embodiment, the support equipment is provided with two way radio communication equipment to communicate messages between the operation support system and the support equipment.

DETAILED DESCRIPTION

Figure 1:
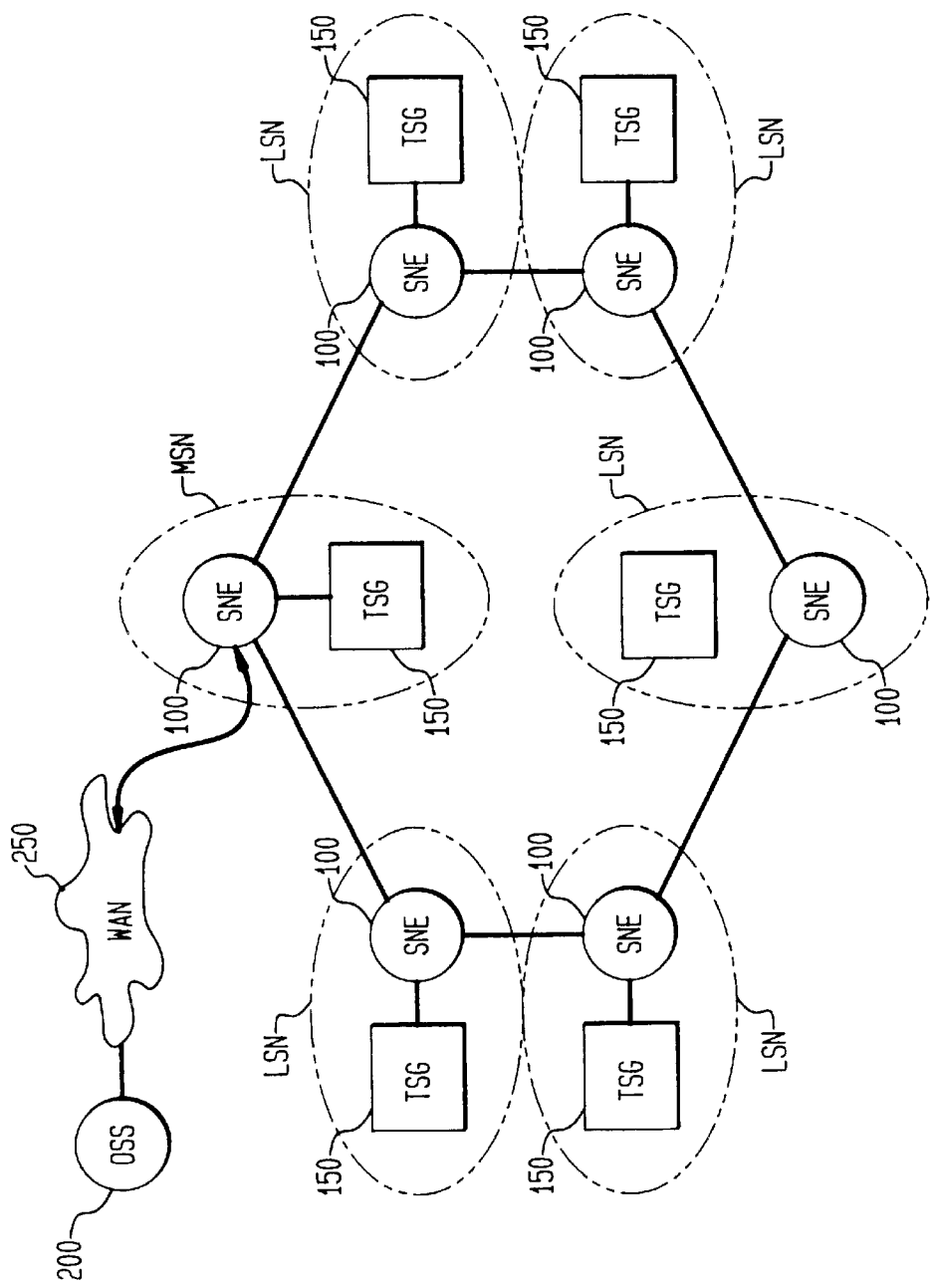
FIG. 1 is a block diagram of a SONET ring suitable for use with the present invention.

FIG. 1 shows a communication system constructed in accordance with the present invention. A SONET ring is populated by a number of SNE's 100 interconnected by optical communication trunks. Each SNE 100 is provided with a TSG 150. The TSG 150 provides a timing reference to its respective SNE. TSG's are configurable devices requiring support from the OSS 200 through signaling. The OSS 200 may interface with the SONET ring through a wide area network 250 ("WAN"), such as AT&T's network service division network. The present invention provides a communication link from the OSS 200 to the TSG's 150.

In the present invention, the SNE may be a SONET network element such as the FT2000 available from Lucent Technologies of Holmdel, N.J. The TSG may be a digital clock distributor such as the DCD523 available from Telecom Solutions of San Jose, Calif.

In a first embodiment, the OSS 200 communicates with the TSG's 150 in a SONET ring through an OSS 200 service channel created from dark bandwidth available in the SONET bitstream. A master service node ("MSN") communicates with the OSS 200, possibly via the WAN 250. The master service node MSN relays messages from the OSS 200 to local service nodes ("LSN") in a SONET ring and vice versa. Local service nodes in the SONET ring monitor the dark bandwidth for the presence of the OSS service channel. When a local service node detects the channel, it determines whether it is the addressee of the message. If so, the local service node keeps the message; otherwise the local service node LSN returns the message to the dark bandwidth and forwards the message to the next local service node in the ring.

Dark bandwidth represents bandwidth that is allocated for events that rarely arise. For example, the U.S. standard provides for two orderwire channels that are intended to be used during maintenance on site at one or more SNE's. The standard contemplates that traditional phone service may not be available at all SNE sites and, therefore, provides the orderwire channels so that the technicians may communicate with one another. Because such maintenance occurs infrequently, the present invention may use an orderwire channel to communicate with TSG's.

Other available dark bandwidth may be used as desired. The standards define other bandwidth that is not allocated currently to any application. As the standards evolve, some of this available bandwidth may be allocated to provide the service channel of the present invention.

Figure 2A:
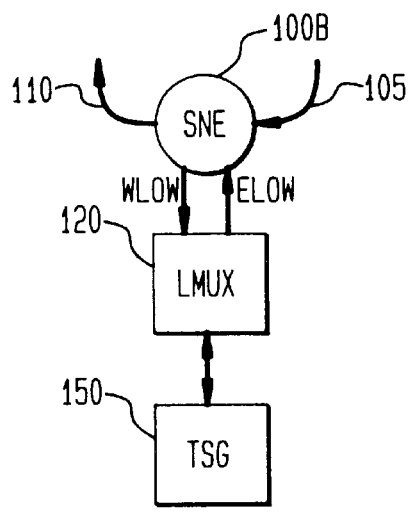
FIG. 2(a) is a block diagram of a local service node of the SONET ring constructed in accordance with the present invention.

FIG. 2(a) illustrates the construction of a local service node LSN. A local service node is provided with a local multiplexor ("LMUX") 120 interconnecting the SNE 100 to the TSG 150. The LMUX 120 is preprogrammed with an LSN address uniquely identifying the local service node.

Figure 2B:
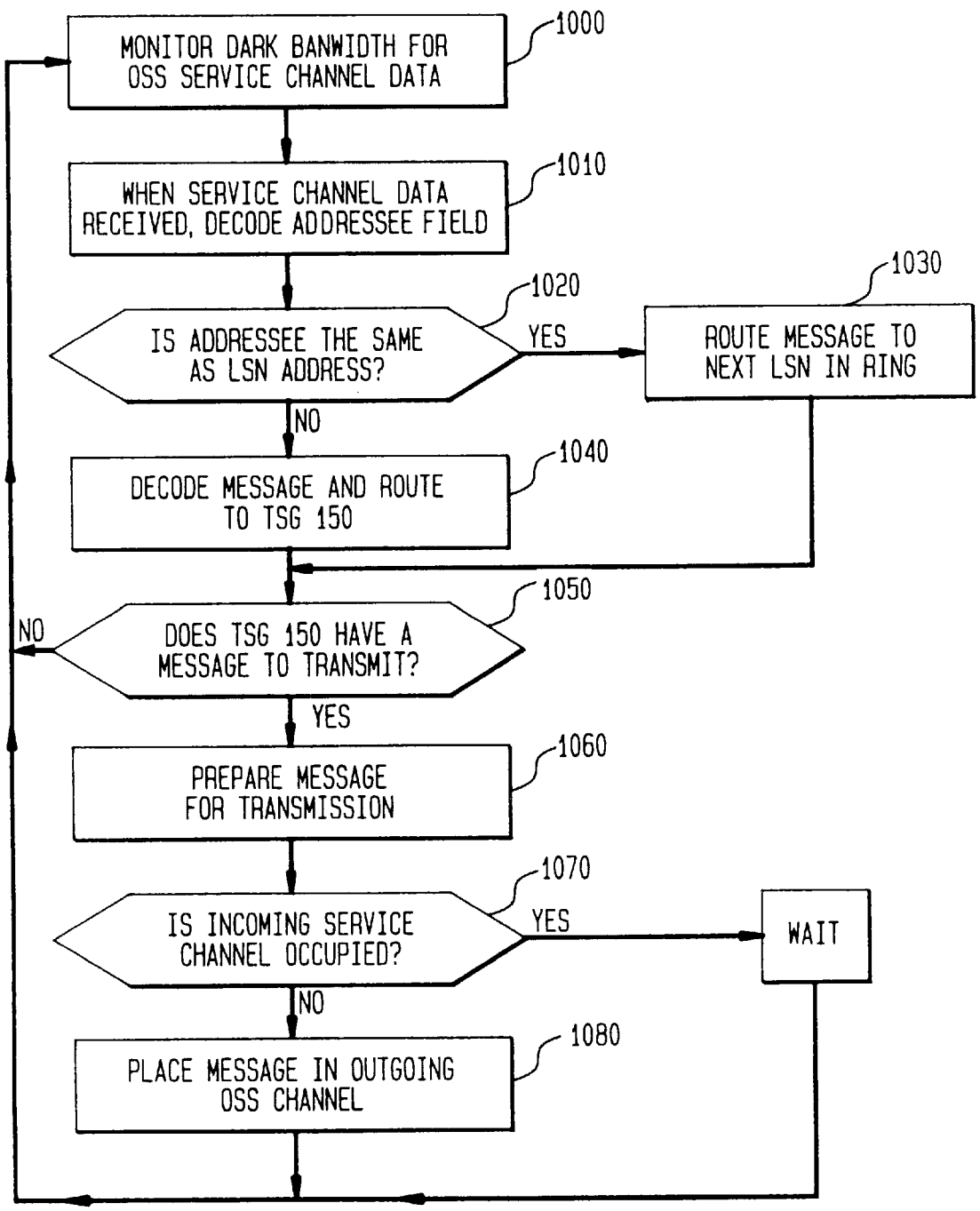
FIG. 2(b) illustrates the operation of a local service node according to the present invention.

The LMUX 120 is configured to monitor dark bandwidth input to the SNE 100 over fiber optic cable 105, looking for an OSS service channel (FIG. 2(b), Step 1000). When OSS signaling is detected, the LMUX 120 decodes the message to identify an addressee field in the message (Step 1010). The MUX 120 compares the decoded addressee field against its own LSN address to determine whether the message is intended for its local service node or another (Step 1020). If the message is addressed to another local service node, the LMUX 120 routes the message on another fiber optic cable 110 for the next local service node in the SONET ring (Step 1030). If the message addresses the LMUX's own local service node, the LMUX routes the message to the TSG 150 (Step 1040).

The LMUX 120 may be a multiplexor model no. A18-05721-xx available from Dantel, Inc., 2991 North Argyle, Fresno, Calif. 93727. In the orderwire embodiment, the LMUX 120 interfaces with the SNE 100 over two orderwire ports provided on the SNE 100. For example, inputs C1 and C2 of the Dantel multiplexor may interconnect directly to the East Line Orderwire ("ELOW") and West Line Orderwire ("WLOW") ports of the SNE over an RS-422 serial interface. The Dantel multiplexor in turn, interfaces with the COM1 port of the DCD-523 timing signal generator as a conventional RS-232 connection.

The OSS service channel will flow through the SONET ring in one direction, such as from east to west. Thus, OSS signaling may be input to the SNE 100 via the eastern port. The LMUX 120 monitors the ELOW port of the SNE 100 for the OSS service channel. When the LMUX 120 encounters service channel messages that address other local service nodes in the ring, the LMUX 120 routes the messages to the WLOW port of the SNE 100.

The TSG 150 may be programmed to issue alerts when it encounters certain operating conditions. To alert the OSS 200, a TSG 150 commands the LMUX 120 to signal the OSS 200 and provides information content of a message to be transmitted over the OSS service channel (Step 1050). The LMUX 120 prepares the message for transmission by including it in a message containing an author field (Step 1060). The author field identifies the originating local service node as the originator for the message. Typically, the LMUX 120 confirms that the incoming service channel is available (unoccupied) and places the message in the outgoing OSS service channel (Steps 1070 and 1080)

Steps 1070 and 1080 may be omitted when the LMUX 120 is the Dantel multiplexor. The Dantel multiplexor divides the dark bandwidth available for use as the service channel into sub-channels, each associated with one of the LSNs. In this embodiment, the messages addressed to and originating from each LSN are placed into an associated sub-channel. In this embodiment, because each sub-channel is associated with a specific one of the LSN's, no addressee or originator field is required in messaging to identify the LSN.

Figure 3A:
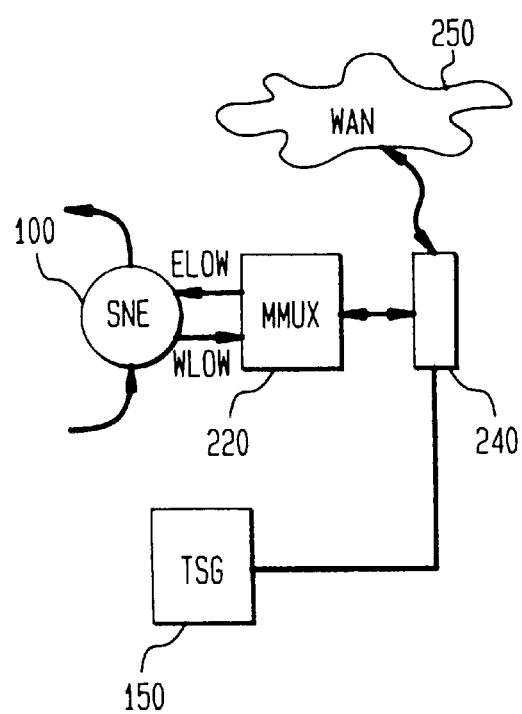
FIG. 3(a) is a block diagram of a master service node of the SONET ring constructed in accordance with the present invention.

Local service nodes communicate with the OSS 200 via a master service node in the SONET ring. Shown in FIG. 3a, the master service node includes a master service node multiplexor ("MMUX") 220 and a switch box 240 that interconnect the SNE 100 to the WAN 250 or to the OSS 200 (FIG. 1). The MMUX 220 and switch box 240 carry messages of the various local service nodes in logical channels. That is, software or hardware control within the MMUX 220 and switch box 240 isolate traffic of a first local service node from traffic of other local service nodes.

Figure 3B:
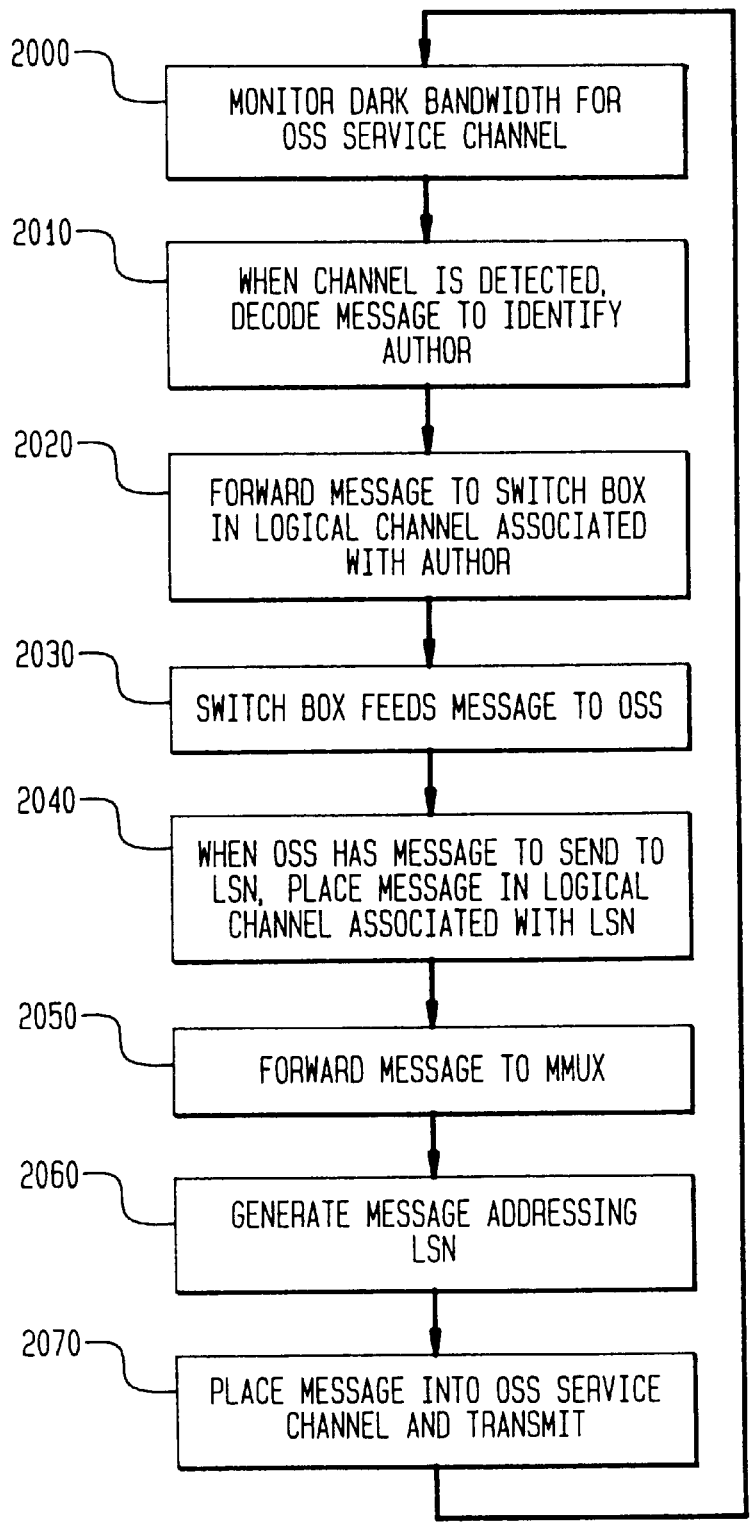
FIG. 3(b) illustrates the operation of the master service node according to the present invention.

As in the local service nodes, the MMUX 220 monitors the dark bandwidth in which the OSS service channel may appear (FIG. 3(b), Step 2000). When signaling is detected, the MMUX 220 decodes the messages to identify the author of the message (Step 2010) and places the message in the logical channel associated with the authoring local service node. The MMUX forwards the message to the switch box 240 (Step 2020). The switch box 240 feeds the messages into the WAN 250 for transport to the OSS 200 (Step 2030).

Messages transmitted from the WAN 250 to the master service node MSN intended for one of the local service nodes are received by the switch box 240. The switch box 240 separates the messages received into the logical channels associated with the appropriate local service nodes (Step 2040). The switch box 240 outputs the content of the logical channels to the MMUX 220 (Step 2050). The MMUX 220 generates an addressee field for the message (Step 2060) and inserts the message into the OSS service channel (Step 2070).

The MMUX 220 may be, for example, model no. A18-05721-xx available from Dantel, Inc. The switch box 240 may be a DataKit II VCS also available from Lucent Technologies. In one embodiment, the switch box 240 and MMUX 220 have different wired connections for each logical channel.

Figure 4A:
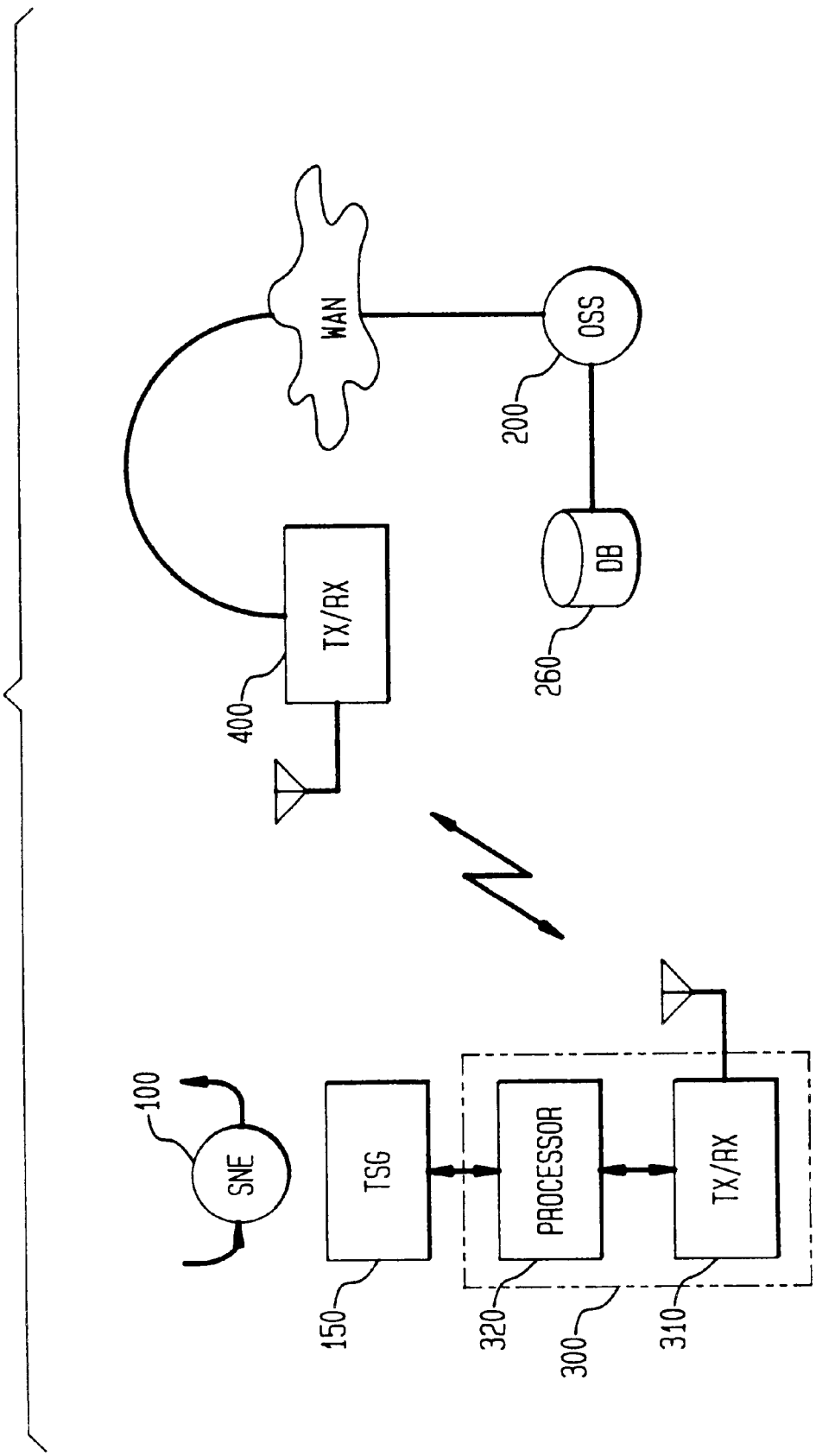
FIG. 4(a) is a block diagram of a second embodiment of the invention.

A second embodiment of the present invention is shown in FIG. 4(a). In this embodiment, each SNE operates as a local service node in communication with the OSS 200 via an RF communication link. The local service node is provided with a two way communicator 300 interconnected to the TSG 150. The communicator 300 includes an RF transceiver 310, such as a two-way pager, and a communicator processor 320. The communicator 300 communicates with a base communicator 400 over the RF link. The base communicator 400 addresses each of the communicators 300 uniquely. The OSS 200 communicates with the base communicator 400 via the WAN 250.

Figure 4B:
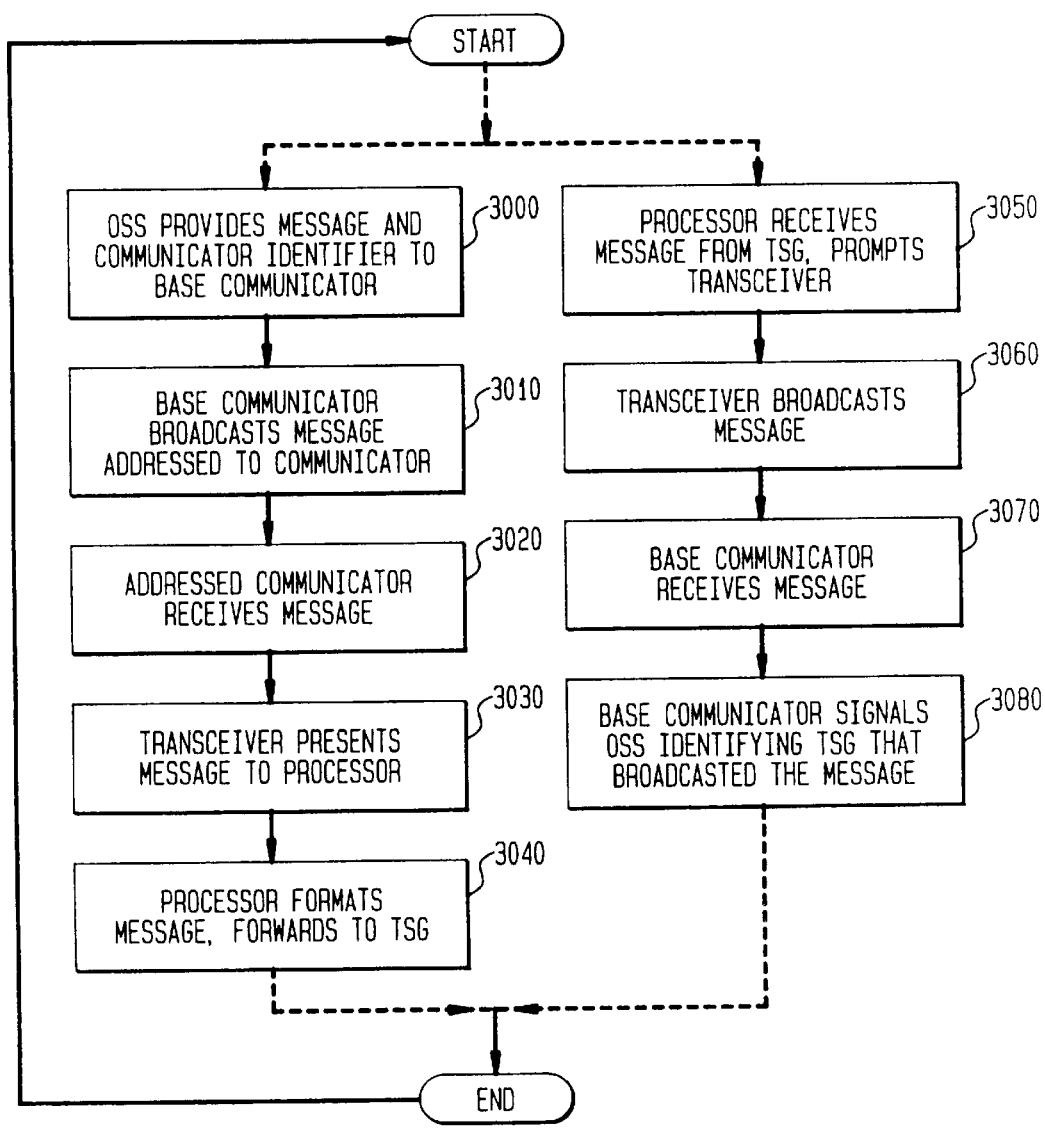
FIG. 4(b) illustrates the operation of the system of FIG. 4 (a).

A method of operation of the second embodiment is shown in FIG. 4 (b). To signal the LSN, the OSS 200 provides the base communicator 400 with a message and an identifier of a communicator 300 to which the message should be delivered (Step 3000). The OSS 200 maintains a database that associates each TSG 150 with the respective communicator 300 to which it is attached. The OSS 200 refers to the database 260 each time it generates messages to a TSG 150 for communication over the RF link.

The base communicator 400 transmits messages to the communicator 300 (Step 3010). The RF transceiver 310 receives the message and converts it down to digital communication data according to procedures known in the art (Step 3020). The transceiver presents the message to the communicator processor 320 (Step 3030), who in turn formats the message and presents it to the TSG 150 (Step 3040).

For communication from the local service node to the OSS 200, the TSG 150 formats a message and presents it to the communicator processor 320 to transmit the message to the OSS 200 (Step 3050). The communicator processor 320 formats the message according to any signaling protocol dictated by the RF link and causes the transceiver 310 to transmit the message. The transceiver broadcasts the message to the base communicator 400 (Step 3060). The broadcast identifies the communicator that broadcasts the message.

The base communicator receives the message and generates a digital signal therefrom (Step 3070). The base communicator then signals the OSS 200, presenting the message and identifying the communicator that originated it (Step 3080).

The transceiver 310 may be, for example, a conventional alpha numeric two way pager such as the RE-FLEX pager commercially available from Motorola, Inc. of Schaumburg, Ill. In this embodiment, the basic communicator may be a commercial paging service. The database 260 stores pager identification numbers associating pagers with each TSG 150. The OSS 200 interfaces with the pager service 400 according to conventional procedures to transmit messages using the pager system.

In the embodiment of FIG. 4(a), it may be desirable to enhance security of the system by encrypting messages before broadcast over the commercial paging system.

The principles of the present invention may be used independently or in tandem. For example, it is anticipated that the communicator embodiment will be less expensive to implement. Thus, each embodiment may be used to provide OSS support to portions of a SONET network.

We claim:

1. A method of communicating with support equipment in an optical network, comprising the steps of:
   monitoring a communication channel for messages intended for the support equipment,
   detecting such a message,
   decoding the message to determine if it contains a predetermined address associated with a particular piece of support equipment, and
   when the message contains t he predetermined address, routing the message to the particular piece of support equipment.

2. The method of claim 1, wherein the communication channel is provided in dark bandwidth of an optical bitstream within the optical network.

3. The method of claim 1, wherein the communication channel is provided in a radio link received by a radio receiver at the particular piece of support requipment.

4. The method of claim 1, further comprising a step of, when the message does not contain the predetermined address, forwarding the signal through the network.

5. The method of claim 1, wherein the optical network is a synchronous optical network.

6. The method of claim 1, wherein the signal creates a service channel within the optical network.

7. The method of claim 6, further comprising steps of:
   detecting, at the network elements, whether to transmit a second message from one of the plurality of support equipment to the operation support office,
   when a second message is to be transmitted, monitoring the dark bandwidth for the presence of a signal, and
   when a signal is not present, placing the second message in the dark bandwidth.

8. The method of claim 7, wherein the placing step places the second message in dark bandwidth of an output transmission line.

9. The method of claim 6, wherein the network elements are interconnected in a ring arrangement.

10. A method of establishing communication between an operation support office and a plurality of support equipment in an optical network, each support equipment associated with a respective network element, the network elements interconnected by optical transmission lines, the method comprising the steps of:
    monitoring dark bandwidth in the optical transmission lines,
    detecting a signal within the dark bandwidth,
    decoding the signal to identify a message contained within the signal, and
    when the message contains a predetermined address, routing the message to the support equipment.

11. The method of claim 6, wherein the network elements are interconnected in a ring arrangement.

12. The method of claim 10, where in the monitoring step monitors dark bandwidth from a predetermined input direction in the optical transmission lines.

13. The method of claim 10, further comprising a step of, when the message does not contain the predetermined address, routing the message to a next network element in the ring.

14. An operation support network for a communication network, comprising:
    a master service node,
    a plurality of local service nodes, wherein the master service node and local service nodes are interconnected in a ring arrangement by communication trunks,
    a plurality of timing generators, one provided in each of the master service node and local service nodes,
    an operation support system in communication with the master service node,
    wherein the master service node receives messages from the operation support system and transmits the messages throughout the communication ring in a service channel provided in dark bandwidth of the communication trunks.

15. The operation support network of claim 14, wherein the master service node comprises:
    a master multiplexer in communication with the operation support system, and
    an optical network element in communication with the multiplexor for placing messages within the dark bandwidth.

16. The operation support system of claim 14, wherein the master service node further comprises a switch box that receives messages from the operation support system and provides the messages to the master multiplexer in a logical channel associated with an address provided in the message.

17. The operation support system of claim 14, wherein the dark bandwidth is an orderwire channel in a SONET network.

* * * * *